United States Patent

[19]

Karlsen

[11] Patent Number: 5,979,234

[45] Date of Patent: Nov. 9, 1999

[54] METHOD AND A DEVICE FOR DETERMINING WIND VELOCITY OR VELOCITY OF A FLUID AND USE THEREOF

[76] Inventor: Lasse Karlsen, Svalvägen 26, S-181 40, Lidingö, Sweden

[21] Appl. No.: 08/836,820

[22] PCT Filed: Nov. 20, 1995

[86] PCT No.: PCT/SE95/01378

§ 371 Date: Jul. 21, 1997

§ 102(e) Date: Jul. 21, 1997

[87] PCT Pub. No.: WO96/16335

PCT Pub. Date: May 30, 1996

[30] Foreign Application Priority Data

Nov. 18, 1994 [SE] Sweden ................................ 9404041

[51] Int. Cl.⁶ ........................... G01F 13/00; G01P 5/00
[52] U.S. Cl. ........................................... 73/170.13
[58] Field of Search ................... 73/170.13, 596; 340/1 C, 16 R; 342/26

[56] References Cited

U.S. PATENT DOCUMENTS

| 3,379,060 | 4/1968 | Pear, Jr. .................................. 73/189 |
| 3,693,433 | 9/1972 | Kobori et al. ........................... 73/189 |
| 3,889,533 | 6/1975 | Balser ................................. 73/170.13 |
| 3,949,605 | 4/1976 | Stallworth et al. .................. 73/170.13 |
| 4,031,756 | 6/1977 | Rotier et al. ........................... 73/189 |
| 4,038,870 | 8/1977 | Rotier ...................................... 73/181 |
| 4,055,830 | 10/1977 | Wilson et al. ........................ 340/16 R |
| 4,286,462 | 9/1981 | Bourne .................................. 73/189 |
| 4,691,569 | 9/1987 | Sato et al. ............................... 73/596 |
| 4,761,650 | 8/1988 | Masuda et al. .......................... 342/26 |
| 4,882,931 | 11/1989 | Breeuwer ................................. 73/189 |
| 4,890,488 | 1/1990 | Pincent et al. ........................... 73/189 |
| 4,891,976 | 1/1990 | Chato ..................................... 73/189 |

FOREIGN PATENT DOCUMENTS

| 1012054 | 7/1952 | France . |
| 1142353 | 9/1957 | France . |
| 1523248 | 5/1966 | Germany . |

Primary Examiner—William Oen
Attorney, Agent, or Firm—Limbach & Limbach L.L.P.

[57] ABSTRACT

A method and apparatus for determining the velocity of wind (or another fluid) in which one or more receiving acoustic detectors at (e.g. a location (A(r,t))) on the ground are arranged to measure the phase direction of arriving waves from one or more sound sources (at locations S(r,t)), all of which may be fixed or moving. A mean value of the wind and its gradient can be obtained along the sound rays (R) between the sources and the detectors. Typical sources may be aircraft or other flying vehicles or objects, or sound sources arranged particularly for the wind measurement. For example at airports, where conventionally the positions of the air vehicles are often rather accurately known, several sets of detectors can be provided for monitoring the wind conditions and for issuing alarms in the case where extreme winds or wind changes are detected.

8 Claims, 4 Drawing Sheets

METHOD AND A DEVICE FOR DETERMINING WIND VELOCITY OR VELOCITY OF A FLUID AND USE THEREOF

This invention relates to a method and a device for measuring atmospheric wind, or more generally the motion of a fluid medium, by means of an acoustic method and also to uses of the method and device.

BACKGROUND

When testing flight vehicles, it is often necessary or beneficial to obtain knowledge of the prevailing wind conditions near the flight path. Existing methods of wind measurement normally supply results in specific points that are either located at considerable distances from the actual flight path or do not give measurements at a the correct time. Around an airport or testing site there is a need for monitoring continuously the wind conditions.

The existing methods of wind measurement are based on a wide variety of principles. Typical meteorological methods include the use of different types of anemometers, balloons, etc. Special testing methods may use smoke emission or other optical means. Most known acoustic methods and devices are based, either on measuring the signal propagation speed, i.e. the speed of sound+the wind speed, or the Doppler effect. In particular, ultrasonic anemometers and sodar systems use these principles. Several such methods and suitable devices are disclosed in U.S. patents U.S. Pat. No. 3,379,060 (time), U.S. Pat. No. 4,031,756 (ultrasonic), U.S. Pat. No. 3,693,433 (ultrasonic anemometer), U.S. Pat. No. 4,038,870 (ultrasonic), the published West German patent application DE-A 1 523 248 (signal propagation time), U.S. patents U.S. Pat. No. 4,286,462 (sodar), U.S. Pat. No. 4,882,931 (air flow), U.S. Pat. No. 4,891,976 (resonance chamber), U.S. Pat. No. 4,890,488 (ultrasonic anemometer), and the French patents FR 1.012.054 and FR 1.142.353 (compressible air flow).

SUMMARY

It is an object of the invention to provide a method and a device for measuring the wind along a ray that starts at a sound source of known location and ends at a detector device.

It is a further object of the invention to provide a method and a device for measuring the wind in a region between a path in the atmosphere, typically a flight path or trajectory, and a detector device.

These objects are acheived by the invention, the features and scope of which appear from the appended claims.

Thus, the method uses a sound source, fixed or moving along a known trajectory, and measures the direction of the sound received at the detector location. The source may be natural or artificial. The mean wind components perpendicular to a sound ray from the source to the detector are calculated. When the source is moving along its trajectory the change of the mean values can be used to determine the local wind near the source trajectory.

The detector devices comprise one-or more receivers having acoustic sensors, which are arranged to measure the phase direction of the sound waves arriving from one or more fixed or moving sound sources. Along the sound rays from the sources to the detectors, a mean value of the cross wind and its gradient can be calculated from the measurements. Typical sources may be aircraft and other flight vehicles or objects or, optionally, specially arranged sound sources.

Thus generally, wind velocity or velocity of a fluid is determined from measurements of the sound from one or more signal sources, that generate sound and are geometrically fixed or moving, in the latter case having known trajectories. The direction of a sound wave is then determined or measured at a detector location, and the determined or measured direction is compared to the direction from the detector location to the point, from which that sound wave has started, the direction of which was determined or calculated. From this direction and the position of the sound source the average velocity is determined for two movement components of that region of the fluid that are located between the detector location and that point, the components being perpendicular to the sound ray, that corresponds to the sound wave.

In the case where the signal source is at several different, known locations, the directions can be determined for these positions and then from these measured directions the average velocity can be determined of the movement components of the fluid at several locations within the fluid region located between the signal source and the detector location.

This can be used by multiplying the determined average velocity or velocities by values of suitably chosen areas, that correspond to or are associated with the fluid region located between the detector location and the point, from which the sound wave started that was used in the determination of an average velocity, for producing a value or values of a flow rate or flow rates respectively.

The device for making the determination has then preferably a sound detector arranged at a detector location, the detector being arranged to determine the direction of a sound wave that arrives to the detector. Also means are provided for calculating the average velocity of the two movement components.

The detector comprises advantageously one or more sound receivers having a number of microphones arranged in an array, means for measuring the phase difference between the signals received by the microphones and for determining therefrom the direction of arriving wave fronts.

In the case where the device is used for calculating a flow rate it comprises some multiplying means for multiplying the calculated average velocity or velocities by values of suitably chosen areas.

The method and device can also be use for surveying an airport region, and then means are provided for detecting continously or periodically the position of air vehicles in the region. Further there are means for detecting continously or periodically the wind in subregions located between an air vehicle and a detector location, these means being preferably made as has been described above. Evaluating means are provided for processing and evaluating the values of detected wind and for issuing an alarm, in those cases when there is a sudden change, in particular from a low value to high value, in a subregion, or when passing from a subregion to an adjacent subregion.

BRIEF DESCRIPTION OF THE DRAWINGS

The invention will now be described with reference to the accompanying drawings in which.

DETAILED DESCRIPTION

The following detailed description is primarily intended to explain the basic principles that are relevant to the function of the present device. Initially, some general principles for the propagation of long wavelength sound through a non-homogeneous fluid, such as the planetary atmosphere, are presented.

The principle of the device is based on the acoustic propagation in a non-homogeneous fluid under the assumption that the length scale of the non-homogeneity is long compared to the typical wavelengths of the sound. This means that the sound waves are assumed to be locally harmonic. This approximation is generally known as geometrical acoustics, see e.g. the book Lighthill, J.: "Waves in Fluids", that is incorporated by reference herein.

Figure 1:
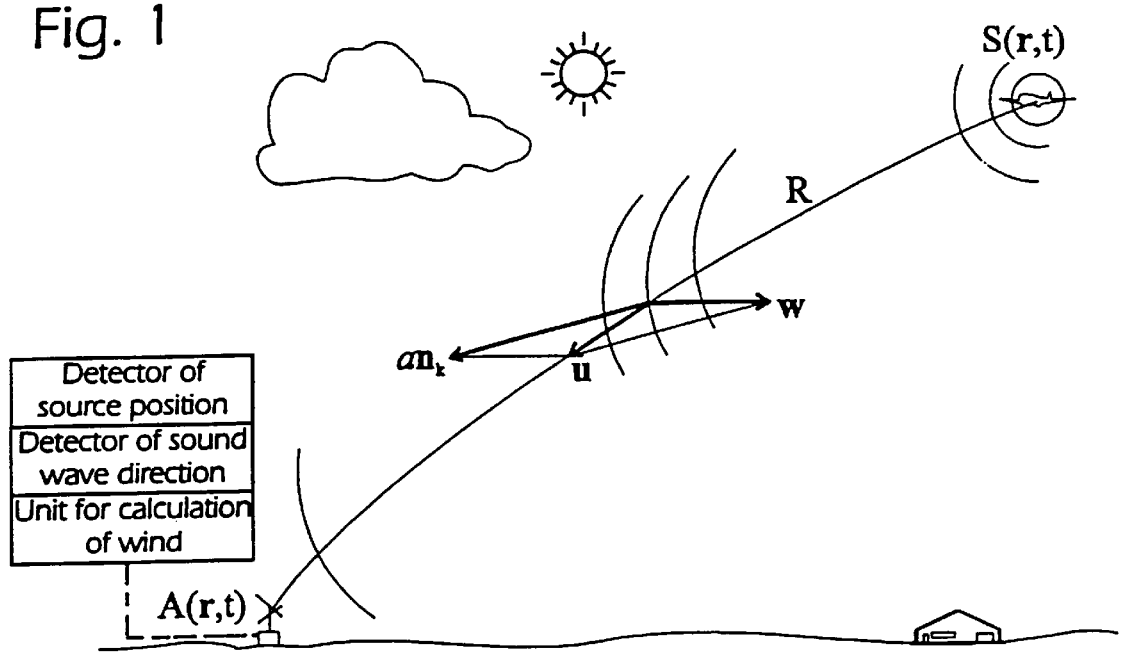
FIG. 1 is a schematic picture illustrating the propagation of sound along a ray R from S to A.

In FIG. 1 a schematic view is shown illustrating an aircraft at the position S(r,t) emitting sound waves in the air along a path R to a detector station located at A(r,t). The detector station receives information from the aircraft on its geometric location, e.g. as obtained from a system like GPS.

In FIG. 1 there is thus a sound source S, the aircraft, having a known position $r_s$ in the fluid, that is the air. The fluid medium has a convection velocity w(r) and a speed of sound a, both of which may vary in space. According to the principles of geometrical acoustics the sound energy is propagated along rays R as wave packets. The wave front direction and the number of wave crests per unit of length are described by the wave number vector k(r). The directions of the rays are therefore given by the propagation velocity of the wave energy, i.e. the group velocity, according to:

$$u = \frac{\partial \omega}{\partial k} \quad (1)$$

where w(r) is the wave frequency.

The geometry of the rays is defined by the trajectories of the wave packets as $$\frac{ds}{dt} = u \quad (2)$$

where $$\frac{d(\cdot)}{dt}$$

is the time derivative taken along the ray.

For the wave number vector the following relation is valid:

$$\frac{dk}{dt} = -\frac{\partial \omega}{\partial r} \quad (3)$$

From the above equations it follows that $$\frac{d\omega}{dt} = 0 \quad (4)$$

that is, the frequency is constant along rays. If the wave is observed relative to the local wind, one detects the relative frequency $\omega_r$. For the latter, the same relation between the wave number and the speed of sound is valid as for a homogeneous fluid at rest:

$$\omega_r = ak \quad (5)$$

The connection between the two frequencies is given by the Doppler relation:

$$\omega = \omega_r + w \cdot k \quad (6)$$

Using the above, the following equations are obtained for the rays and the velocity of the wave packets:

$$\frac{ds}{dt} = u = w + \frac{a}{k} k \quad (7)$$

and, finally, for the wave number $$\frac{dk}{dt} = -k \cdot \frac{\partial w}{\partial r} - k \frac{\partial a}{\partial r} \quad (8)$$

The last equation (8) is the foundation for the method and device described herein. It describes the refraction of the waves due to the wind, the first term, and variations in the speed of sound. The detector instrument at the receiver A in the figure measures the direction of k and compares it to the direction that would have been obtained in a homogeneous fluid at rest.

The receiver at A consists of a number of pressure transducers or microphones and associated electronics, arranged to measure the direction of the wave number vector k. The receiver measures the phase direction pertaining to the wave packets that propagate along the ray R. The station at A also has a calculation unit, e.g. some microcomputer. The ray belonging to the waves that arrive at A at time instant t=0 is defined by integration of the propagation velocity according to eq. (7):

$$\oint_R w dt + \oint_R an_k dt = -r_s(-t_s) \quad (9)$$

This equation also defines the transit time $t_s$. The component of eq. (9) along the ray is the basis for a number of existing anemometers. These devices normally utilise the special case of straight rays, when, obviously, a constant wind component along the ray may be calculated from the transit time.

The principles as described herein are, quite on the contrary, based on the refraction of the waves, i.e. the change of $n_k$, which is approximately determined by the wind components and the gradients in the transverse direction to the ray. For this purpose eq. (8) may be written on the alternative form:

$$\frac{dn_k}{dt} = -D_p(w \cdot n_k + a) \quad (10)$$

-continued $$\frac{1}{k}\frac{dk}{dt} = -D_n(w \cdot n_k + a) \quad (11)$$

Figure 2:
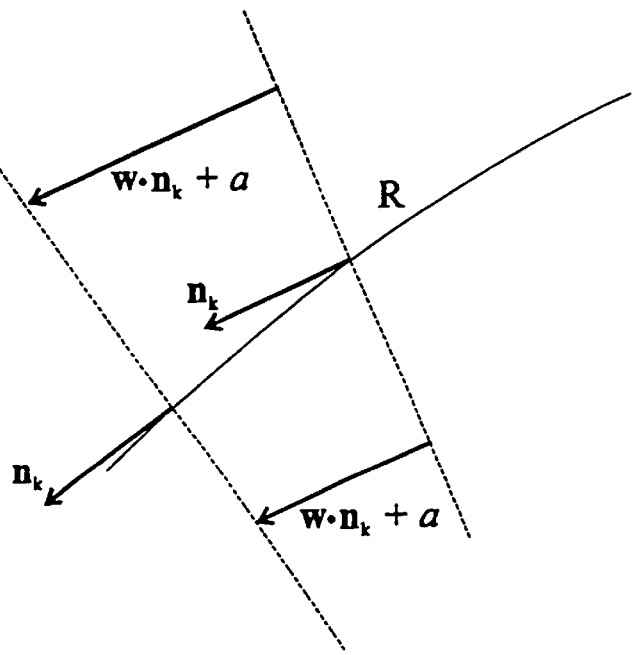
FIG. 2 is a schematic view showing refraction of the sound due to a gradient.

Eq. (11) describes the change of the wave number perpendicular to the wave fronts and is used by some known devices for measuring the wind in this direction, a method that requires a sound source having known frequency characteristics. For the device described here only eq. (10) is used. FIG. 2 illustrates the significance of this equation. The change of the phase direction is a result of the variation of the component of the signal propagation velocity that is normal to the wave front, i.e. the sum of the gradients of the wind and the speed of sound.

The various rays radiated from the source S are distinguished by their initial phase direction $n_k^s(r_s)$. The measured result at the receiver A, i.e. the phase direction $n_k^A$, is obtained by integration of eq. (10) along the ray R:

$$n_k^A = -\oint_R D_p(w \cdot n_k + a)dt + n_k^s \quad (12)$$

At an arbitrary point along the ray, which may be designated by the subway R(t) from S up to the considered point, the phase direction is similarly given by:

$$n_k(t) = -\oint_{R(t)} D_p(w \cdot n_k + a)dt + n_k^s \quad (13)$$

This may alternatively be expressed in the measured result according to (12) as $$n_k(t) = n_k^A - \Delta n_k(t) \quad (14)$$

$$\Delta n_k(t) = -\oint_{R-R(t)} D_p(w \cdot n_k + a)dt \quad (15)$$

where R-R(t) denotes the rest of the ray up to the receiver A. With the condition (9) for the ray, the measured result is finally given by:

$$n_k^A = \oint_R \frac{w}{a_m} d\tau + \oint_R \frac{a}{a_m} \Delta n_k d\tau - \frac{r_s}{a_m t_s} \quad (16)$$

$$\tau = \frac{t}{t_s} \quad (17)$$

$$a_m = \oint_R a\, d\tau \quad (18)$$

The measured result is a combination of the mean wind and the gradient effect. The last term in (16) is the geometrical direction to the source.

Obviously, there are several possible wind variations along the ray that may give a particular measured result. In the general case, some assumptions must therefore be made as to the form of possible variations, e.g. as follows:

Parametrisation:

Assume a model for the wind profile and the speed of sound with a given number $n_\delta$ of parameters δ. Every given set of parameters results in a specific measured result through integration of eq. (16) as explained above. The measured result therefore gives one relation between the model parameters. In order to determine the wind profile, $n_\delta$ independent measurements are required along different rays. This can be accomplished by means of several sources or receivers or by making them movable. Some example procedures are given below.

Reference frame

Figure 3:
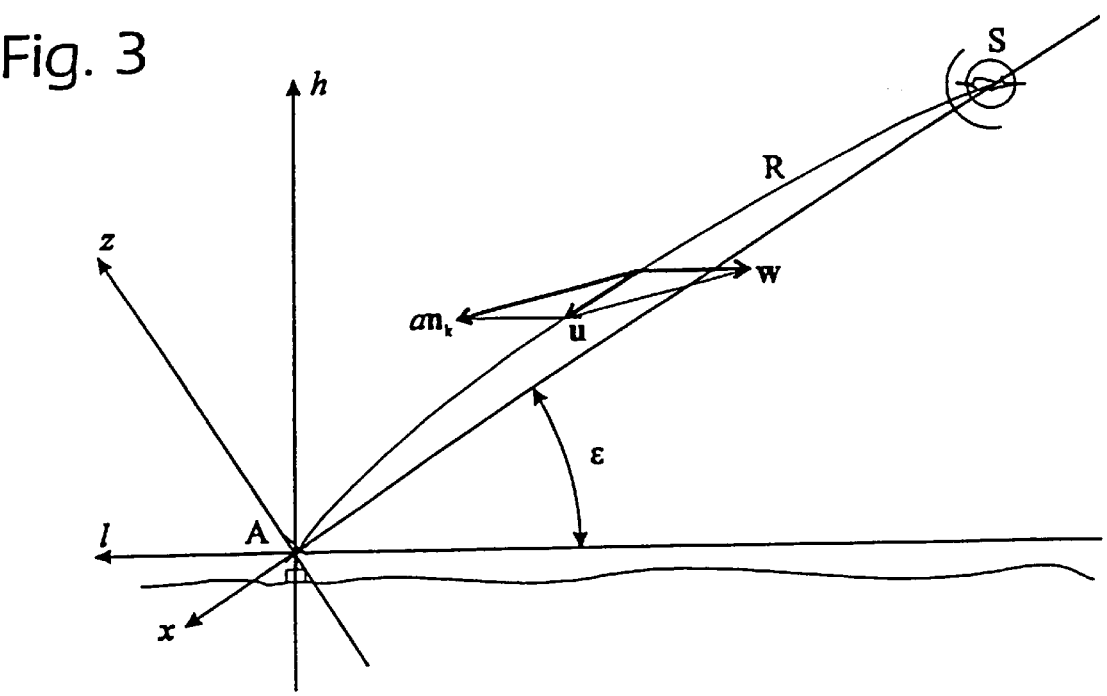
FIG. 3 is a schematic view showing a frame of reference for a ray.

Choose a frame of reference for the ray as shown in FIG. 3 where the x-axis is directed from S towards A (the longitudinal component). The lateral components are z, contained in the "vertical plane", and y, contained in the "horizontal plane" (these designations have obvious meanings for the case of atmospheric wind).

For the lateral components the condition (9) for the ray gives:

$$\oint_R w_{y,z} dt + \oint_R a n_{k_{y,z}} dt = 0 \quad (19)$$

The measured result from eq. (16):

$$n_{k_{y,z}}^A = -\oint_R \frac{w_{y,z}}{a_m} d\tau + \oint_R \frac{a}{a_m} \Delta n_{k_{y,z}} d\tau \quad (20)$$

Special case of small refraction

A good approximation using simplified calculations may be obtained in the case where the magnitude of the wind w is small compared to the speed of sound a, an assumption that is often quite reasonable. Along the ray the following is then valid on average:

$$n_{k_{y,z}} \ll 1\, n_{k_z} \approx 1 \quad (21)$$

From eq. (12) it follows:

$$n_{k_y}^A \approx -\oint_R \frac{\partial}{\partial y}(w_x + a)dt + n_{k_y}^s \quad (22)$$

$$n_{k_z}^A \approx -\oint_R \frac{\partial}{\partial z}(w_x + a)dt + n_{k_z}^s \quad (23)$$

Similarly, one gets for the direction of the rays by means of the group velocity:

$$u_{y,z} \approx w_{y,z} + a n_{k_{yz}} \quad (24)$$

$$u_x \approx w_x + a \quad (25)$$

The integral along the ray may be approximated by:

$$\oint_R (\cdot) dt \approx \int_{x_s}^0 (\cdot) \frac{dx}{u_x} \quad (26)$$

which gives the transit time:

$$t_s \approx \int_{x_s}^0 \frac{dx}{u_x} \quad (27)$$

From eq. (20) the following approximation is obtained for the measured result:

$$n_{k_{y,z}}^A \approx -\oint_{x_s}^0 \frac{w_{y,z}}{a} d\xi + \oint_{x_s}^0 \frac{a}{a} \Delta n_{k_{y,z}} d\xi \quad (28)$$

-continued $$\xi = -\frac{x}{x_s} \quad (29)$$

$$\bar{a} = \oint_{x_s}^{0} a d\xi \quad (30)$$

Examples of measurement procedures

The examples described hereinafter are based on the assumption of small refraction, but this assumption is not always necessary even for the situations considered.

Longitudinal propagation

For this particular case the lateral gradient of the phase velocity is zero, and the phase direction is therefore constant along the ray.

$$\Delta n_{k_{yz}} = 0 \quad (31)$$

The measured result is then directly related to the mean wind lateral component from eq. (20):

$$n_{k_{y,z}}^A = -\oint_R \frac{w_{y,z}}{a_m} d\tau \quad (32)$$

If the variation of $u_x$ is small along x, eq. (28) gives:

$$\bar{w}_{y,z} = -n_{k_{yz}}^A \bar{a} \quad (33)$$

If two sources are located along the ray, it is easily deduced from this result that the mean lateral wind between the sources may be calculated from the difference of the values obtained from eq. (33). According to an example discussed below, this may be generalised to a moving source, from which the wind components along the trajectory may be obtained.

Special case: Constant wind and speed of sound

This is the most simple case conceivable and may serve as an illustration of the basic principle. According to FIG. 1 and eq. (7) the propagation velocity also becomes constant in both magnitude and direction. Hence, the ray is a straight line between the source and the receiver.

Figure 4:
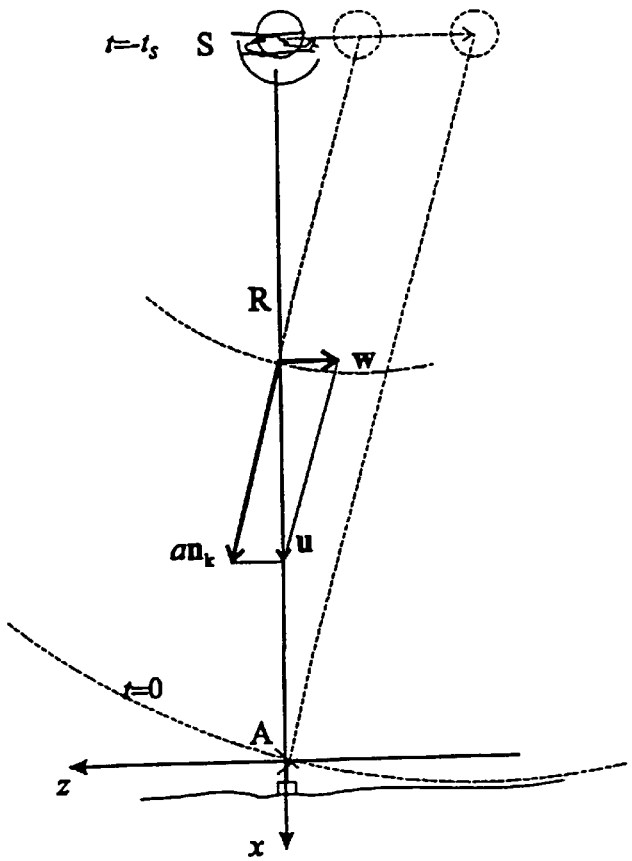
FIG. 4 is a schematic view showing the propagation of sound for a constant wind and constant speed of sound.

FIG. 4 shows the propagation of the wave packets in a pure cross-wind. For this case it is clear from the figure or from eq. (33) that the measured result is:

$$w_z \approx -n_{k_z}^A \bar{a} \quad (34)$$

It may be more easy to understand the propagation process by observing the wave packet from a position that moves along with the wind from the source, i.e. along the dashed lines in the figure. The wave front then propagates as a growing circle in the same way as in a fluid at rest.

Vertical stratification

Assume that the wind components and the speed of sound are only dependent on one coordinate direction, typically the vertical altitude h. If we take the y component as being horizontal, the statements above concerning longitudinal propagation are still valid for this component.

Assume that the vertical component $w_h$ of the wind is zero on average. For the horizontal component $w_1$ a suitable wind model may be used to parametrise the vertical wind profile, f. ex. with strength $w_0$, length scale $h_1$, and shape parameter a, etc.:

$$w_1(h) = W_1(h; w_0, h_1, \alpha) \quad (36)$$

The vertical shear is then expressed as:

$$\frac{\partial w_l}{\partial h} = S_l(h; w_0, h_l, \alpha) \quad (36)$$

and similarly for the gradient of the speed of sound:

$$\frac{\partial a}{\partial h} = S_a(h) \quad (37)$$

Consider a ray in the same way as for longitudinal propagation forming an angle $\epsilon$ to the horizontal plane:

$$\frac{\partial}{\partial z}(\cdot) = \cos\varepsilon \frac{\partial}{\partial h}(\cdot) \quad (38)$$

The phase direction is then given by:

$$\Delta n_{k_z}(t) \approx -\cos^2\varepsilon \oint_{R-R(t)} S_l(h(t))dt - \cos\varepsilon \oint_{R-R(t)} S_a(h(t))dt \quad (39)$$

The vertical velocity of the wave packets along the ray is:

$$\frac{dh}{dt} = u_h = an_{k_h} \approx -a\sin\varepsilon \quad (40)$$

The phase direction may then be further written as:

$$\Delta n_{k_z}(h) \approx -\cos\varepsilon \cot\varepsilon \int_h^0 \frac{S_l(h)}{a} dh - \cot\varepsilon \int_h^0 \frac{S_a(h)}{a} dh \quad (41)$$

and after carrying out the integration:

$$\Delta n_{k_z}(h) \approx -\cot\varepsilon \left[ \cos\varepsilon \left\{ \frac{W}{a} - \frac{W_A}{a_A} + \int_h^0 \frac{W}{a} \frac{S_a}{a} dh \right\} + \ln\frac{a}{a_A} \right] \quad (42)$$

where the conditions at the receiver are denoted by the sub-script A. The remaining integral in eq. (42) is small, and a good approximation is hence:

$$\Delta n_{k_z}(h) \approx -\cot\varepsilon \left[ \cos\varepsilon \left\{ \frac{W_A}{a_A} - \frac{W}{a} \right\} + \ln\frac{a_A}{a} \right] \quad (43)$$

From eq. (28) the measured result is obtained as:

$$n_{k_z}^A \approx \oint_R \frac{W}{a} \frac{dh}{a_m t_s} - \oint_R \frac{\Delta n_{k_s}}{\sin\varepsilon} \frac{dh}{a_m t_s} \quad (44)$$

When eq. (43) is substituted in (44), the integral containing ln a may be neglected to give for the final result:

$$n_{k_s}^A \approx -\sin\varepsilon \int_0^{h_s} \frac{W}{a} dh' - \cot\varepsilon\cos\varepsilon \int_0^{h_s} \left( \frac{W}{a} - \frac{W_A}{a_A} \right) dh' \quad (45)$$

$$h' = \frac{h}{h_s} \quad (46)$$

The mean wind is consequently obtained from the measured result if the wind is known at the receiver A.

Accuracy and disturbances

The accuracy of the present method primarily depends on the signal/noise ratio between sound as issued by the source used and the background environment. The detection of the sources against the noise is improved for broadband sources. Several known signal processing techniques may be applicable to reduce the influence of the noise.

Apart from the background noise the measured result may be disturbed by fluid effects such as unsteadiness, turbulence, temperature gradients, variations of the speed of sound, and the local velocity field near the source.

Applications

The following are just a few examples of possible applications and embodiments.

Examples of signal sources and receiver array

Typical natural sources may be aircraft, missile rocket engines, or fluid wakes, such as from artillery shells. Special sources may be arranged where appropriate.

To detect the phase direction a receiver in the form of a 3-dimensional transducer array may be suitable. The array would typically contain at least 4 microphones whose signals are sampled. Such an array is e.g. described in the published International patent application WO-A1 91/10876. The direction may then be evaluated by e.g. correlation analysis of these signal samples. Several known processing techniques may be appropriate to this end.

Utilisation of moving or multiple sources and receivers

The change of the measured results with time can be used to obtain information on the local wind along the source trajectory. In combination with a wind model, such as one or more of those described above, i.e. longitudinal propagation or vertical stratification, the wind profile along the trajectory may be estimated. Alternatively, several simultaneous sources or receivers may be applied to acquire measured results along multiple rays through the fluid medium.

The method described above is particularly useful when testing flight vehicles, or when information about a large volume of the fluid is desirable, such as the air around an airport. Some examples are given in the following.

Cross-wind at a moving object

It is often desirable to know the cross-wind at a moving object, which also should serve as the source of sound. Examples of this situation are missile testing, rocket launching, firing artillery shells, and approaching aircraft. It is possible to devise methods based on several models for the wind, but in the following example the principle is illustrated in the simple case where the receiver is close to the direction of the source trajectory.

Figure 5:
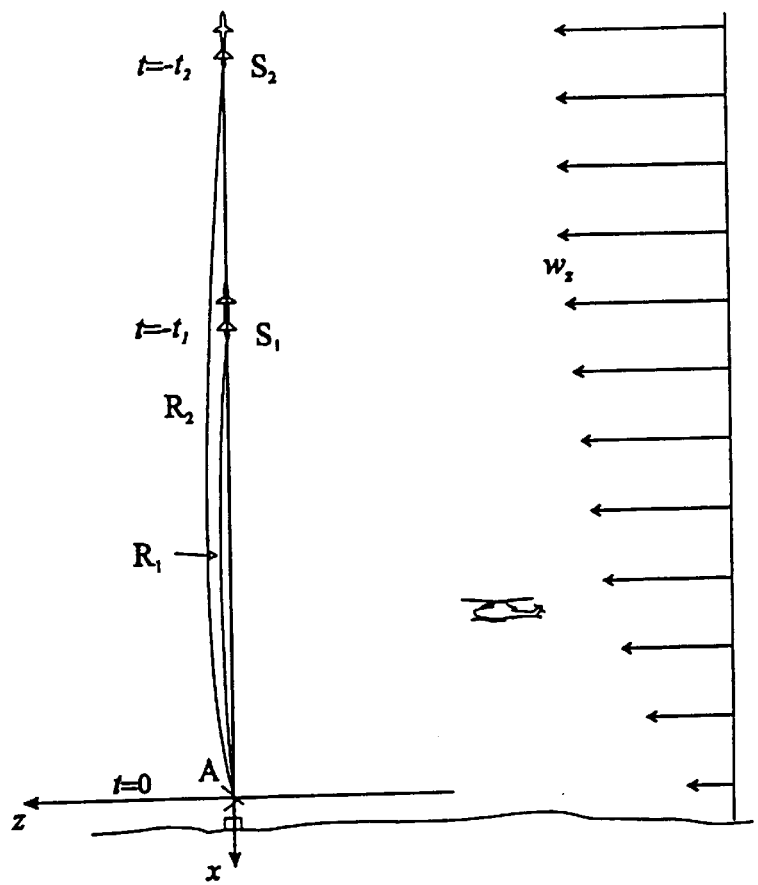
FIG. 5 is a schematic picture showing a source moving in a variable cross wind.

Receiver located on the source trajectory extension:

For this case the source is moving along the x-axis. Consider only longitudinal propagation, such as for a vertical flight path or for the horizontal wind component in vertical stratification. FIG. 5 shows one plane of vertical flight path. A similar case is obtained for the horizontal component if the flight path is not vertical.

The figure shows two positions of the source along the flight path. Because the wind varies along the trajectory, different measured results are obtained for the waves originating at $S_1$ and $S_2$ respectively. According to eq. (33):

$$(n^A_{k_s})_1 = -\left(\frac{w_z}{a}\right)_1 \tag{47}$$

$$(n^A_{k_s})_2 = -\left(\frac{w_z}{a}\right)_2 \tag{48}$$

The difference between the two measurements depends on how the wind (and possibly the speed of sound) changes between the points 1 and 2. In this way the mean value between 1 and 2 can be calculated from:

$$\left(\frac{w_z}{a}\right)_{12} = \frac{1}{x_2 - x_1}\left\{x_1\left(\frac{w_z}{a}\right)_1 - x_2\left(\frac{w_z}{a}\right)_2\right\} \tag{49}$$

If continuous measurements are taken along the flight path, the local cross-wind midway between the measurement points is obtained, i.e. the wind profile.

Aircraft hazard warning

Figure 6:
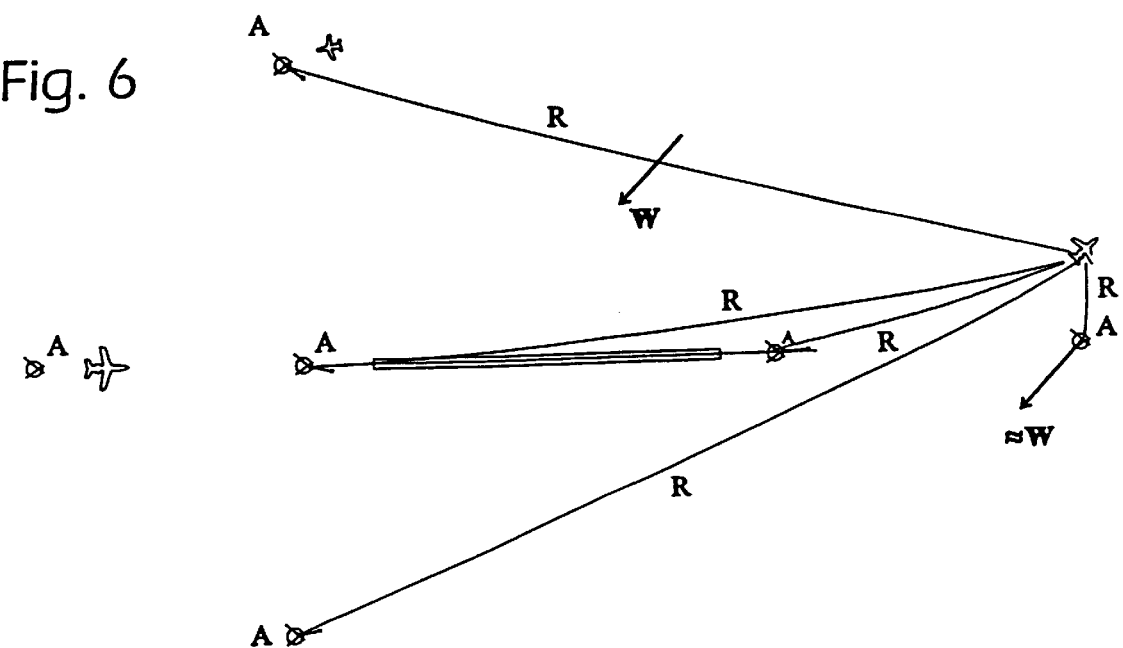
FIG. 6 is a schematic picture showing an airport surveillance system.
Figure 7A:
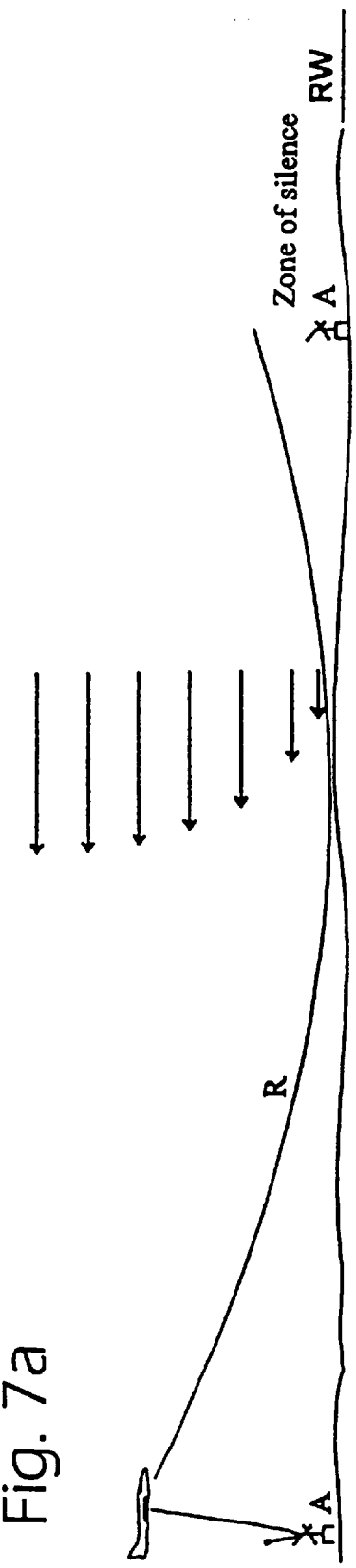
FIGS. 7a and 7b are schematic pictures illustrating detection of a micro-burst or wind shear.
Figure 7B:
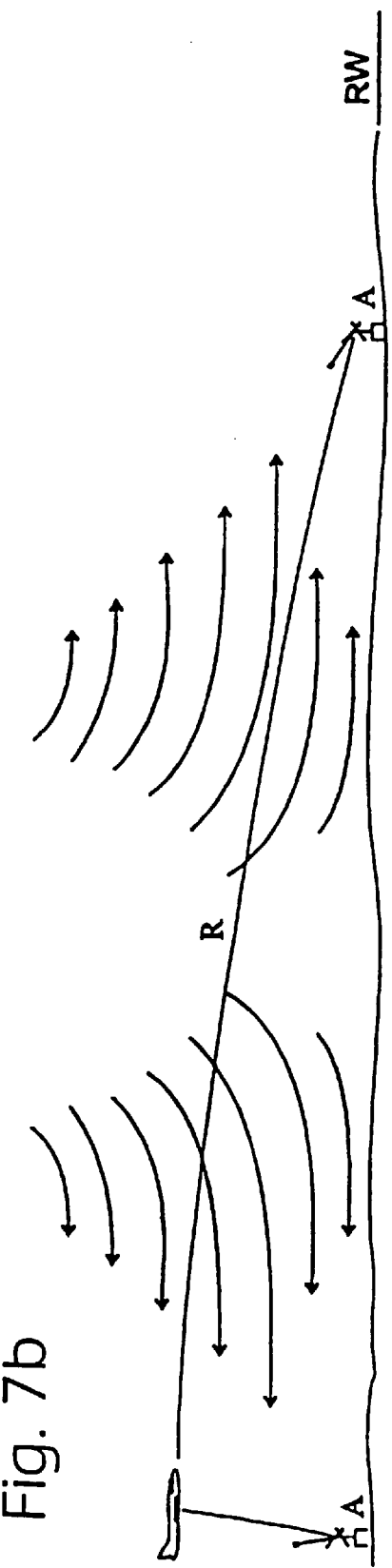

FIG. 6 shows an overview of an airport wind surveillance system based on the present methods. Several receivers may be located in suitable positions at the airport, along runway extensions, or in the surrounding areas below approach and departure flight corridors. All receivers may use the sound sources from all aircraft within detectable and useful distances. The aircraft positions will all be known with sufficient accuracy from universal navigation and communications systems such as e.g. DGPS. This arrangement results in a multitude of measured results along rays that cover a large part of the airspace around the airport. If these measured values are used to evaluate parameters in a wind model of the airport micro-meteorological conditions, abnormal conditions, such as strong fronts and burst cells, potentially hazardous to aircraft safety, may be detected at a safe distance from the runways. Another example is shown in FIGS. 7a, 7b, which illustrates a change from normal wind conditions to a micro-burst situation along the landing approach flight path. Normally, as shown in FIG. 7a, the wind direction is predominantly head-on. This produces a ground wind layer with a shear that turns the sound rays upwards. For small approach slope angles the receiver near the runway (RW) threshold may be in the so called zone of silence, where most of the sound energy has been deflected upwards, i.e. no rays from the aircraft sound source reach the receiver. The present system then gives no information on the wind. The micro-burst situation shown in FIG. 7b is very dangerous to most aircraft, and can be detected by the present method. Because of the totally changed wind shear profiles, the sound rays now reach the receiver, and a strong down-wind component is measured. Also, as the micro-burst cell approaches the airport, the chances of detection by the method as explained with reference to FIG. 6 are very good, providing a good early warning capability as well.

Flow rate examples

As can be seen from the integral along the ray in eq. (20), the measured result is exactly equivalent to the flow rate across the ray in the absence of the shear gradient term. The device as described herein may therefore be used also to measure the flow rate through channel cross sections, etc. if a sufficient number of rays are provided. This may be accomplished by a moving source or by several sources and receivers, as exemplified in the following.

Wind power turbine

The efficiency of a horizontal axis wind turbine is related to the total air energy flux through the rotor disk, which is proportional to the cube of the mean flow. This latter quantity can be measured directly by the present method in the following way: The receiver is placed on the ground below and in the plane of the rotor disk. The sound signal source is placed near the tip of one or more rotor blades. When the source moves a certain small distance along the periphery of the disk, it sweeps out a pie-shaped area centred at the receivers. The product of this area and the measured result, according to the present method, is precisely the volume flow of air through the swept area. When this process is repeated to cover one complete revolution of the rotor, the sum is the total flow through the rotor disk.

Mean flow through a tube or open channel

As with the previous example the fluid flow through any channel cross-section may be determined, such as in pipe flow, water flow in rivers, mean air flow by wind through a valley, etc. For many such applications it may be most practical to place several sound sources and receivers to form a pattern of rays that cover the region of interest.

I claim:

1. A method of determining wind velocity or velocity of a fluid from measurements of sound from one or more signal sources, geometrically fixed or moving, having known trajectories, including the steps of:

measuring the direction of a sound wave at a detector location, where the sound wave has propagated through a fluid from a point to the detector location, comparing the measured direction to the direction from the detector location to the point, and determining therefrom the average velocity for two movement components of the fluid between the detector location and that point, in directions perpendicular to the sound ray that corresponds to the sound wave.

2. A method according to claim 1, in the case where sound is measured derived from a moving signal source, including the steps of:

measuring the direction of those sound waves, that arrive to the detector location and are issued from the signal source, when said signal source is at several different, known locations, and determining from the measured directions the average velocity of the movement components of the fluid at several locations within the fluid region between the signal source and the detector location.

3. The method of claim 1 or 2, characterized in that the determined average velocity or velocities are multiplied by values of suitably chosen areas, that correspond to or are associated with the fluid region located between the detector location and the point, from which the sound wave started that was used in the determination of an average velocity, for producing a value or values of a flow rate or flow rates respectively.

4. A device for determining velocity of a fluid from measurements of the sound from one or more signal sources, geometrically fixed or moving, having known trajectories, said device including:

a sound detector arranged at a detector location for determining the direction of a sound wave arriving to the detector after propagating through the fluid, and means for processing at least one signal from the sound detector to calculate the average velocity of two movement components of the fluid, the components being in directions perpendicular to that of the sound ray that corresponds to the sound wave.

5. A device according to claim 4, wherein the detector comprises:

one or more sound receivers having a number of microphones arranged in an array, and means for measuring the phase difference between the signals received by the microphones and for determining therefrom the direction of arriving wave fronts.

6. A device according to claim 4 or 5, for measuring sound that is derived from a moving signal source, including:

means for calculating several average velocities of sound waves issued for different locations of the signal source and for determining therefrom the fluid velocity at several locations in the region between the signal source and the receiver.

7. A device according to claim 4 or 5, including:

multiplying means for multiplying the calculated average velocity or velocities by values of suitably chosen areas, that correspond to or are associated with the fluid region located between the detector location and the point, from which the sound wave started that was used in the determination of an average velocity, for producing a value or values of a flow rate or flow rates respectively.

8. A device according to claim 6, including:

multiplying means for multiplying the calculated average velocities by values of suitably chosen areas, that correspond to or are associated with the fluid regions located between the detector location and the points from which the sound waves started that were used in determination of the average velocities, for producing values of flow rates.

* * * * *